UNITED STATES PATENT OFFICE.

JOSEPH SCHMUCK, OF STEGLITZ, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

PACKING FOR LIGHT-SENSITIVE LAYER-CARRIERS.

No. 930,621.  Specification of Letters Patent.  Patented Aug. 10, 1909.

Application filed July 22, 1907. Serial No. 385,073.

*To all whom it may concern:*

Be it known that I, JOSEPH SCHMUCK, mechanist, a citizen of the German Empire, residing at 8ª Hubertus-strasse, Steglitz, near Berlin, Germany, have invented certain new and useful Improvements in Packings for Light-Sensitive Layer-Carriers, of which the following is a specification.

This invention relates to improvements in packings for light-sensitive layer carriers.

The improved packing comprises a light-sensitive layer-carrier such as a photographic film or plate a removable light tight envelop open at one end and a closing member for the open end of said envelop.

The new packing is of most simple construction and of slight thickness and the envelop thereof can be safely and easily removed from the film, when the incased films are in a box or the like of the camera suitable for the exposure of the films.

The purpose of the invention is obtained by securing the closing member effecting the light-tight closure of the interior of the cover, on to the one end of the film or plate in such a manner that the edges of the open envelop are squeezed between the edges of the closing member and the film or the like. The removal of the light-tight cover from the film may, with such construction be effected in a simple and safe manner.

The box containing the incased film can be provided with a catch or the like to engage the closing member so as to retain the film in the box, when the light-tight envelop is withdrawn out of the box.

As in the improved film case the engagement or grip of the closing member on the envelop is slight in order to render the withdrawal of said envelop from the closing member possible, care has to be taken that the light does not have access to the interior of the case at this point. For this purpose the sides of the closing member are united together at their ends, so that the groove or slit formed in said closing member for the reception of the film and also the mouth of the closing member for the reception of the edges of the light tight envelop are closed at their ends.

The annexed drawing illustrates the invention.

Figure 1:
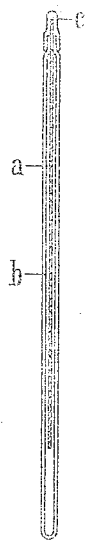
Figure 2:

Figure 1 is a longitudinal section, perpendicular to the closing member and Fig. 2 is a cross-section, parallel to the edge of the closing member.

The film is indicated on the drawing by $a$, the light-tight envelop by $b$ and the closing member by $c$. The closing member $c$ squeezes with its front-edges the open end of the light-tight envelop $b$ and also grips the film $a$. When arranging the parts the closing member $c$ is first firmly pressed on to the edge of the film $a$, the free edges of the closing member not being subjected to any pressure, so that the open end of the envelop $b$ may be pushed between the free edges of the closing member. As soon as this is done, the free edges of the closing member $c$ are also subjected to pressure, sufficiently forcible to assure a light-tight closing joint and at the same time allowing the withdrawal of the envelop from the closing member.

From Fig. 2 it can be seen that the groove formed by the closing member is closed at both its ends, that is to say, at both sides of the film.

Having now particularly described and ascertained the nature of my said invention and in what manner the same is to be performed, I declare that what I claim is:

An improved packing for light-sensitive layer carriers, comprising a light sensitive layer carrier, a removable envelop open at one end, and a closing member forming a receptacle or cap closed on all sides and at its outer end, said closing member being directly secured along a portion of the interior of its sides on the edge of the layer carrier and the remainder of its sides being bent outwardly to form a space between the layer carrier and the sides of the closing member for the reception of the end of the envelop, said bent portions of the sides contacting along their whole surface with the layer carrier.

In testimony whereof I have signed this specification in the presence of two subscribing witnesses.

JOSEPH SCHMUCK.

Witnesses:
  HENRY HASPER,
  WOLDEMAR HAUPT.